US008474531B2

(12) United States Patent
Nasr et al.

(10) Patent No.: US 8,474,531 B2
(45) Date of Patent: Jul. 2, 2013

(54) STEAM-GAS-SOLVENT (SGS) PROCESS FOR RECOVERY OF HEAVY CRUDE OIL AND BITUMEN

(75) Inventors: Tawfik Noaman Nasr, Katy, TX (US); David A. Brown, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 317 days.

(21) Appl. No.: 12/949,506

(22) Filed: Nov. 18, 2010

(65) Prior Publication Data

US 2011/0120709 A1 May 26, 2011

Related U.S. Application Data

(60) Provisional application No. 61/386,867, filed on Sep. 27, 2010.

(51) Int. Cl.
*E21B 43/24* (2006.01)
*E21B 36/00* (2006.01)

(52) U.S. Cl.
USPC .................. 166/272.4; 166/303; 166/401

(58) Field of Classification Search
USPC ............... 106/401, 403, 272.3, 272.4, 272.1, 106/302, 303
See application file for complete search history.

(56) References Cited

U.S. PATENT DOCUMENTS

| | | | | |
|---|---|---|---|---|
| 3,954,141 A | * | 5/1976 | Allen et al. | 166/403 |
| 3,983,939 A | * | 10/1976 | Brown et al. | 166/269 |
| 4,004,636 A | * | 1/1977 | Brown et al. | 166/401 |
| 4,007,785 A | * | 2/1977 | Allen et al. | 166/272.1 |
| 4,008,764 A | | 2/1977 | Allen | |
| 4,026,358 A | | 5/1977 | Allen | |
| 4,109,720 A | * | 8/1978 | Allen et al. | 166/269 |
| 4,271,905 A | * | 6/1981 | Redford et al. | 166/402 |
| 4,344,485 A | * | 8/1982 | Butler | 166/271 |
| 5,899,274 A | * | 5/1999 | Frauenfeld et al. | 166/401 |
| 6,230,814 B1 | * | 5/2001 | Nasr et al. | 166/400 |
| 6,662,872 B2 | | 12/2003 | Gutek et al. | |
| 7,464,756 B2 | | 12/2008 | Gates et al. | |
| 7,527,096 B2 | * | 5/2009 | Chung et al. | 166/268 |
| 2003/0000711 A1 | | 1/2003 | Gutek et al. | |
| 2003/0062159 A1 | * | 4/2003 | Nasr | 166/272.1 |
| 2005/0211434 A1 | | 9/2005 | Gates et al. | |
| 2006/0162922 A1 | | 7/2006 | Chung et al. | |
| 2007/0181299 A1 | | 8/2007 | Chung et al. | |
| 2008/0017372 A1 | * | 1/2008 | Gates et al. | 166/254.1 |
| 2009/0260811 A1 | * | 10/2009 | Cui et al. | 166/272.3 |
| 2010/0096147 A1 | * | 4/2010 | Nenniger et al. | 166/401 |

FOREIGN PATENT DOCUMENTS

CA 2323029 * 3/2004

* cited by examiner

*Primary Examiner* — Angela M DiTrani
*Assistant Examiner* — Anuradha Ahuja
(74) *Attorney, Agent, or Firm* — ConocoPhillips Company

(57) ABSTRACT

Methods relate to a steam-gas-solvent (SGS) process for recovery of heavy crude oil and bitumen. The methods include injecting a steam-gas-solvent mixture to mobilize hydrocarbons in a formation and producing from the formation the hydrocarbons that are mobilized. The steam-gas-solvent mixture includes steam, a gas non-condensable under reservoir operating conditions and a solvent condensable under reservoir operating conditions.

10 Claims, 5 Drawing Sheets

STEAM-GAS-SOLVENT (SGS) PROCESS FOR RECOVERY OF HEAVY CRUDE OIL AND BITUMEN

This application is a non-provisional application which claims benefit under 35 USC §119(e) to U.S. Provisional Application Ser. No. 61/386,867 filed Sep. 27, 2010, entitled "STEAM-GAS-SOLVENT (SGS) PROCESS FOR RECOVERY OF HEAVY CRUDE OIL AND BITUMEN," which is incorporated herein in its entirety.

STATEMENT REGARDING FEDERALLY SPONSORED RESEARCH OR DEVELOPMENT

None

FIELD OF THE INVENTION

This invention relates generally to a steam-gas-solvent (SGS) process for recovery of heavy crude oil and bitumen.

BACKGROUND OF THE INVENTION

A variety of processes are used to recover viscous hydrocarbons, such as heavy crude oils and bitumen, from underground deposits. A problem associated with producing hydrocarbons from such deposits is that the hydrocarbons are too viscous to flow at commercially viable rates at temperatures and pressures present in the reservoir. In some cases, these deposits are mined using open-pit mining techniques to extract the hydrocarbon-bearing material for later processing to extract the hydrocarbons.

Over the past few years, improved techniques including thermal and solvent techniques have been developed to recover viscous hydrocarbons. Thermal techniques heat the reservoir fluids and rock to produce the heated, mobilized hydrocarbons from wells. One of the drawbacks to the thermal techniques is a large amount of energy (e.g., steam) is required to produce the crude oil or bitumen. For example, approximately 2.5 barrels of water converted to steam are required to produce one barrel of oil. This steam generation requires burning of fossil fuel (e.g., natural gas, coal) that results in undesirable green-house gas emissions.

One thermal method of recovering viscous hydrocarbons using two vertically spaced wells is known as a steam-assisted gravity drainage (SAGD) process. In the SAGD process, steam is pumped through an upper, horizontal injection well into a viscous hydrocarbon reservoir while the heated, mobilized hydrocarbons are produced from a lower, parallel, horizontal production well vertically spaced proximate to the injection well. The injection and production wells are typically located close to the bottom of the hydrocarbon deposits.

Prior approaches also utilize solvent to dilute the formation fluids for production of the diluted, mobilized hydrocarbons from wells. The solvent soaks into the formation fluids to dilute and reduce the viscosity of the heavy crude oil and bitumen. A vapor extraction (VAPEX) technique is similar to the SAGD process in terms of well arrangement and location, however, the technique differs in terms of the fluid injected, i.e., solvent vapor instead of steam. One of the drawbacks to the VAPEX technique is solvent penetration of heavy crude oil or bitumen is typically quite slow, which results in low production rates. Further, some portion of the solvent is lost in the reservoir, which increases the cost of production. In comparison to conventional SAGD, addition of the solvent to the steam in the SAGD process increases recovery and decreases energy requirements per barrel; however, amount of the steam used over time is unchanged given the increased recovery.

Therefore, a need exists for processes to recover heavy crude oil and bitumen that is energy efficient and provides an economical production rate.

SUMMARY OF THE INVENTION

In one embodiment, a method of recovering hydrocarbons includes injecting steam into a formation to transfer heat to hydrocarbons in the formation resulting in condensation of the steam and injecting into the formation a solvent for the hydrocarbons and that is liquid under reservoir operating conditions to reduce viscosity of the hydrocarbons upon dissolution with the solvent. Injecting into the formation a gas non-condensable under reservoir operating conditions supplements the steam in maintaining of pressure in the formation as the hydrocarbons and condensate of the steam are being produced. Further, the method includes producing from the formation the hydrocarbons mobilized by the injecting of the steam, the gas and the solvent.

According to one embodiment, a method of recovering hydrocarbons includes injecting a steam-gas-solvent mixture to mobilize hydrocarbons in a formation. The steam-gas-solvent mixture includes steam, a gas non-condensable under reservoir operating conditions and a solvent for the hydrocarbons and that is condensable under reservoir operating conditions. The method also includes producing from the formation the hydrocarbons that are mobilized.

For one embodiment, a method of recovering hydrocarbons includes forming within a formation a steam-gas-solvent well pair having an injection well and a production well. Injecting into the injection well a steam-gas-solvent mixture mobilizes hydrocarbons in the formation produced from the formation through the production well. The steam-gas-solvent mixture includes steam, a gas non-condensable under reservoir operating conditions and a solvent for the hydrocarbons and that is condensable under reservoir operating conditions.

These and other objects, features, and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present inventions, reference should be made to the following detailed disclosure, taken in conjunction with the accompanying drawings, in which like parts are given like reference numerals, and wherein.

DETAILED DESCRIPTION OF PREFERRED EMBODIMENTS OF THE INVENTIONS

Figure 1:
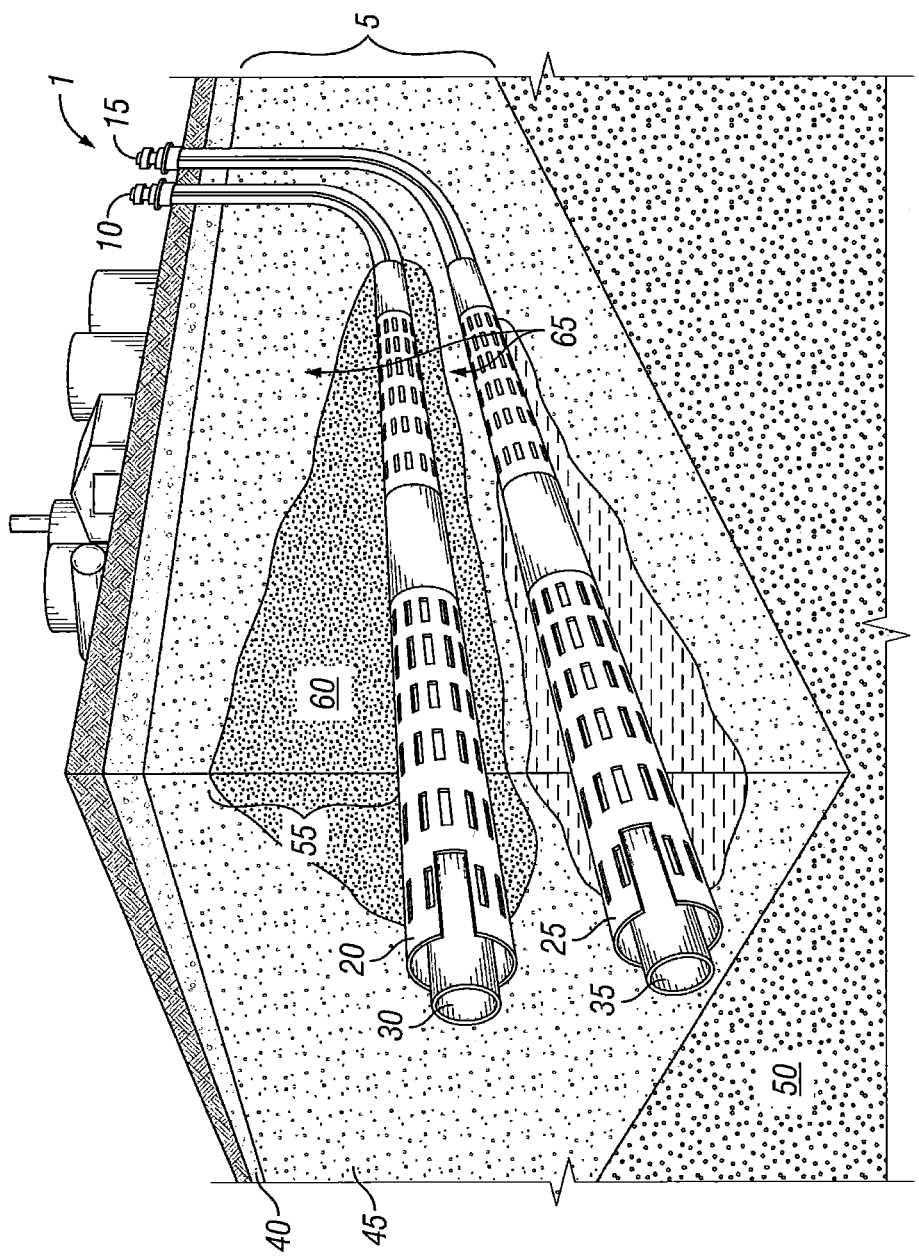
FIG. 1 is a perspective side view of an exemplary well pair for steam-gas-solvent (SGS) operations, according to one embodiment of the invention.

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto to be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

The present invention uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical ranges of about 1 to 10 provides literal support for a claim reciting "greater than 1" (with no upper bounds) and a claim reciting "less than 10" (with no lower bounds).

Methods relate to a steam-gas-solvent (SGS) process for recovery of hydrocarbons including heavy crude oil and bitumen. The methods include injecting a steam-gas-solvent mixture to mobilize the hydrocarbons in a formation and producing from the formation the hydrocarbons that are mobilized. The steam-gas-solvent mixture includes steam, a gas non-condensable under reservoir operating conditions (referred to sometimes herein as "the gas") and a solvent condensable under reservoir operating conditions (referred to sometimes herein as "the solvent").

As compared to a SAGD process, the SGS process decreases cumulative amount of energy (i.e., steam) required to produce the oil and thus reduces the green-house gas emissions associated with such steam requirements even without negative influence on production. In some embodiments, production rate utilizing the SGS process may increase relative to the SAGD process due to combined influence of the steam and the solvent lowering viscosity of the hydrocarbons. The gas that is non-condensable in the reservoir provides better pressure compensation relative to the steam since the steam condenses requiring excess injection of the steam to account for such condensation.

By contrast, addition of gas that is non-condensable in the reservoir with steam alone reduces recovery performance dependent on only thermal transfer for viscosity reduction. In particular, gas that does not condense in the reservoir when combined with only steam inhibits achieving necessary viscosity reduction of the hydrocarbons due to lowering temperature of the steam from partial pressure reduction and insulating an interface between the hydrocarbons and the steam. In a further comparison, addition of solvent alone with steam injection lacks any benefit on total steam requirements because volume of steam injected cannot be diminished without lowering pressure needed in the reservoir to sustain proper injection and production.

FIG. 1 illustrates an exemplary SGS well pair 1 for hydrocarbon production. The SGS well pair 1 is drilled into a formation 5 with an injection well 10 vertically spaced proximate to a production well 15. While shown by example in a steam assisted gravity drainage well pair orientation, some embodiments utilize other configurations of the injection well 10 and the production well 15, which may be combined with the injection well 10, offset vertically relative to the injection well 10, or arranged crosswise relative to the injection well 10, for example. Further, the SGS process described herein may rely on other production techniques, such as use of the SGS as a drive fluid or cyclic injecting and producing during alternating periods of time.

For some embodiments, the injection well 10 is an upper, horizontal well, and the production well 15 is a lower, parallel, horizontal well vertically spaced proximate to the injection well 10. In one embodiment, the injection well 10 is vertically spaced about 4 to 6 meters, or about 5 to 6 meters, above the production well 15. For one embodiment, the SGS well pair 1 is located close to the bottom of an oilsands 45 (i.e., hydrocarbon deposits). Generally, the oilsands 45 are disposed between caprock 40 and shale 50.

While not limited to any particular arrangement, the injection well 10 may include a first tubing string 30 disposed within an injection wellbore (or casing) 20. Similarly, the production well 15 may include a second tubing string 35 disposed within a production wellbore (or casing) 25. In one embodiment, the injection well 10 and the production well 15 are both completed with a screened (porous) casing (or liner) defining the wellbores 20, 25. The tubing strings 30, 35 extend toward the end of the liner forming an annulus between the tubing strings 30, 35 and respective ones the wellbores 20, 25.

During operation, a mixture 60 of steam, gas non-condensable under reservoir operating conditions and solvent for the hydrocarbons and that is condensable under reservoir operating conditions pass through the injection well 10 such that the production well 15 collects the heated/diluted, mobilized crude oil or bitumen 65 that flows out of the formation 5 along with any gas, solvent and/or water from condensate of the steam. The injection of the mixture 60 forms a "steam chamber" 55 that expands vertically and laterally into the formation 5. Dilution from the solvents and/or the heat from the solvents and/or the steam reduce the viscosity of the heavy crude oil or bitumen 65, which then flows down into the production wellbore 25.

The solvent that may be injected as a vapor prior to condensing in the reservoir and/or the steam rise due to their relatively low density compared to the density of the heavy crude oil or bitumen 65. Further, the gas injected and/or any released formation gases including methane, carbon dioxide, and, possibly, some hydrogen sulfide from the heavy crude or bitumen, rise in the steam chamber 55 to fill the void left by the draining crude oil or bitumen 65. The heated/diluted crude oil or bitumen 65 and the condensed solvents and/or steam (i.e., water) flow counter to the rising gases and drain into the production wellbore 25 by gravity forces. In some embodiments, the crude oil or bitumen 65 and condensed solvents and/or water are recovered to surface by pumps such as progressive cavity pumps suitable for moving high-viscosity fluids with suspended solids. The water may be separated from the crude oil or bitumen and recycled to generate more steam. The gas injected and/or the solvent may also be separated from the crude oil or bitumen and injected again with more steam.

Methods described herein thus rely on both solvent and thermal benefits to reduce the viscosity of the heavy crude oil or bitumen 65. The solvent benefits are provided by dilution of formation fluids through continuous or intermittent injection of gases that are non-condensable under reservoir operating conditions and/or solvents condensable under reservoir operating conditions. The thermal benefits are provided by conductive and convective heating of formation fluids and rock through continuous or intermittent injection of the steam and/or the solvents condensable under reservoir operating conditions.

The gas and/or solvent additives to the mixture 60 may be injected continuously with the steam, or, alternatively, one or both of the additives may be injected intermittently or sequentially with the steam at different time intervals. The gas non-condensable under reservoir operating conditions is selected from the group consisting of air, nitrogen, hydrogen, oxygen, carbon dioxide, carbon monoxide, hydrogen sulfide, methane, ethane, propane, butane, natural gas, flue gas and mixtures thereof. The flue gas may be obtained from any industrial fuel burning installation (e.g., steam generator, direct combustion device). In one embodiment, the gas non-condensable under reservoir operating conditions includes gases that are soluble in heavy crude oil or bitumen and reduce oil viscosity (e.g., methane, carbon dioxide). The solvent condensable under reservoir operating conditions is selected from the group consisting of any hydrocarbon in C3-C30 range (e.g., propane, butane, pentane, hexane), aromatics (e.g., toluene, xylene), naptha, diesel, carbonless compounds (e.g., sulfur hexafluoride, hydrogen sulfide) and mixtures thereof. The reservoir operating conditions including pressure and temperature therefore define whether any particular composition by itself is referred to as non-condensable under reservoir operating conditions or condensable under reservoir operating conditions. The solvent condensable under reservoir operating conditions thus condenses or is otherwise liquid in the reservoir prior to liquid-liquid contact that forms a heavy crude oil or bitumen solution containing the solvent.

In one embodiment, the mixture 60 is injected at a volume fraction of between about 0.10 to 0.30 of the steam, between about 0.60 to 0.90 of the gas, and between about 0.01 to 0.10 of the solvent, wherein the sum of the volume fractions of steam-gas-solvent is equal to about 1.0. For example, the mixture 60 may be injected at a volume fraction of about 0.160 of the steam, about 0.824 of the gas, and about 0.016 of the solvent. For one embodiment, adjusting of the total fluid injection rate of the mixture 60 maintains a desired pressure in the formation 5. In one embodiment, total fluid injection rate of the mixture 60 is adjusted to maintain the injection bottom hole pressure at about 3.4 MPa.

Simulation studies were completed using numerical simulator CMG STARS (2007.10) and a 3-D reservoir model to evaluate potential benefits of co-injecting a gas (e.g., methane) non-condensable under reservoir operating conditions and a solvent (e.g., hexane) condensable under reservoir operating conditions with steam in a SGS process. The 3-D reservoir model was an Athabasca oil sands reservoir of 120 meters in width by 25 meters in height by 750 meters in length. Referring to FIG. 1, the SGS well pair 1 was placed near the middle and towards the bottom of the 3-D reservoir represented by the formation 5. The wellbores 20, 25 extended 750 meters in a horizontal direction and were vertically separated by 5 meters. The production well 15 was placed 1 meter above the bottom of the oilsands (i.e., hydrocarbon deposits). Initially, a pre-heating stage of 75 days was used to heat the formation fluids and rock between the wells by re-circulating steam in both the injection well 10 and the production well 15 (i.e., similar to a pre-heating stage for SAGD operations in the field).

A baseline case of steam only injection (i.e., SAGD production) was used for comparison with a steam-gas-solvent case. In the SAGD baseline case, after the 75-day pre-heating stage, steam was injected through the injection well 10 and heated, mobilized hydrocarbons were produced through the production well 15. The numerical simulator adjusted the total fluid injection rate of steam to maintain a maximum injection bottom hole pressure at about 3.4 MPa.

In the steam-gas-solvent case, methane was used as the gas, and hexane as the solvent, however, other gases and solvents may be used, as discussed above. The methane-hexane additives were injected continuously with the steam, however, one or both of the gas-solvent additives may be injected intermittently or sequentially with the steam at different time intervals. After the 75-day pre-heating stage, a mixture of steam-methane-hexane at a volume fraction of 0.160 of steam, 0.824 of methane and 0.016 of hexane was injected into the injection well 10 and heated/diluted, mobilized hydrocarbons were produced from the production well 15. The volume fractions of 0.160, 0.824 and 0.016 were selected to demonstrate the concept of the SGS process, however, other volume fractions may be used, as discussed above. Similar to the SAGD case above, the numerical simulator adjusted the total fluid injection rate of the steam-methane-hexane mixture to maintain a maximum injection bottom hole pressure at about 3.4 MPa.

Figure 2:
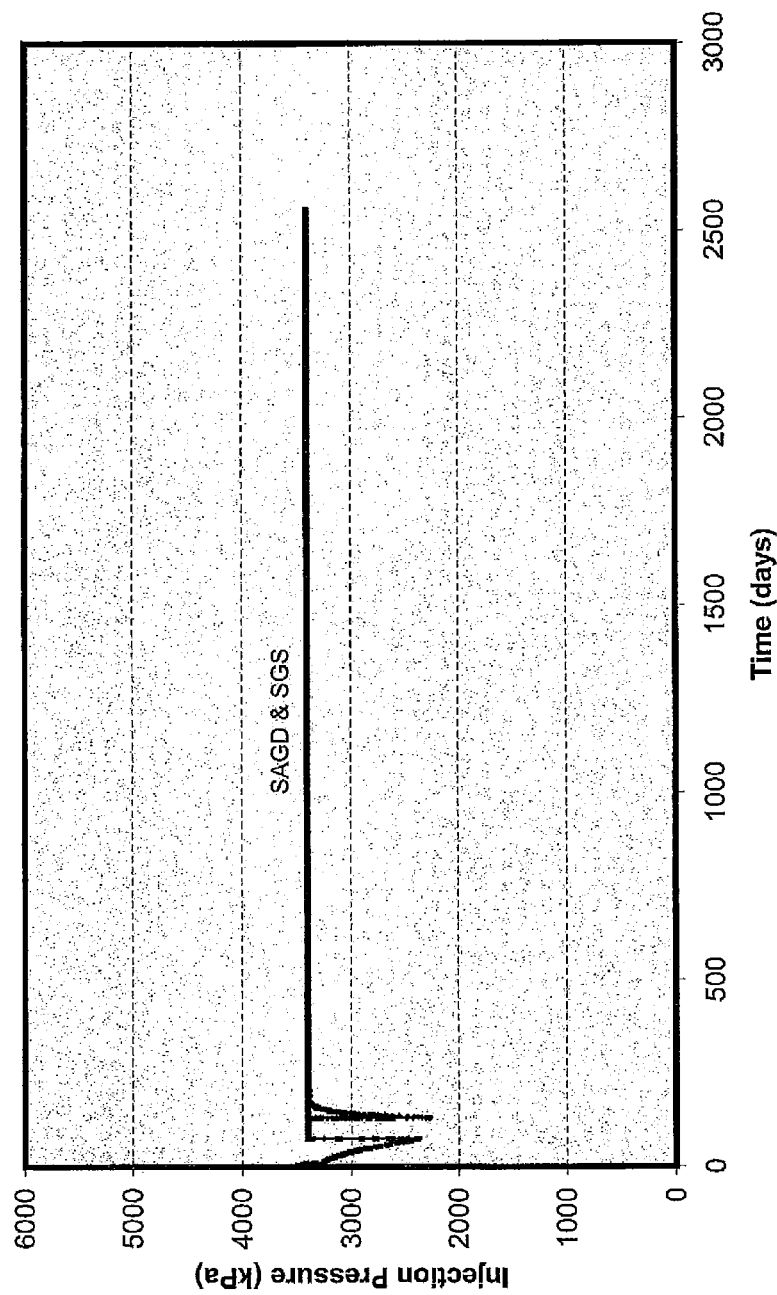
FIG. 2 is a plot of injection pressure versus time, according to one embodiment of the invention.

FIG. 2 shows a plot of injection pressure versus time. This plot illustrates that an injection bottom hole pressure of 3.4 MPa was maintained throughout the SAGD and SGS processes. However, maintaining of the pressure with the SAGD process relied only on injection rate of the steam requiring excessive quantities of the steam to account for condensation of the steam.

Figure 3:
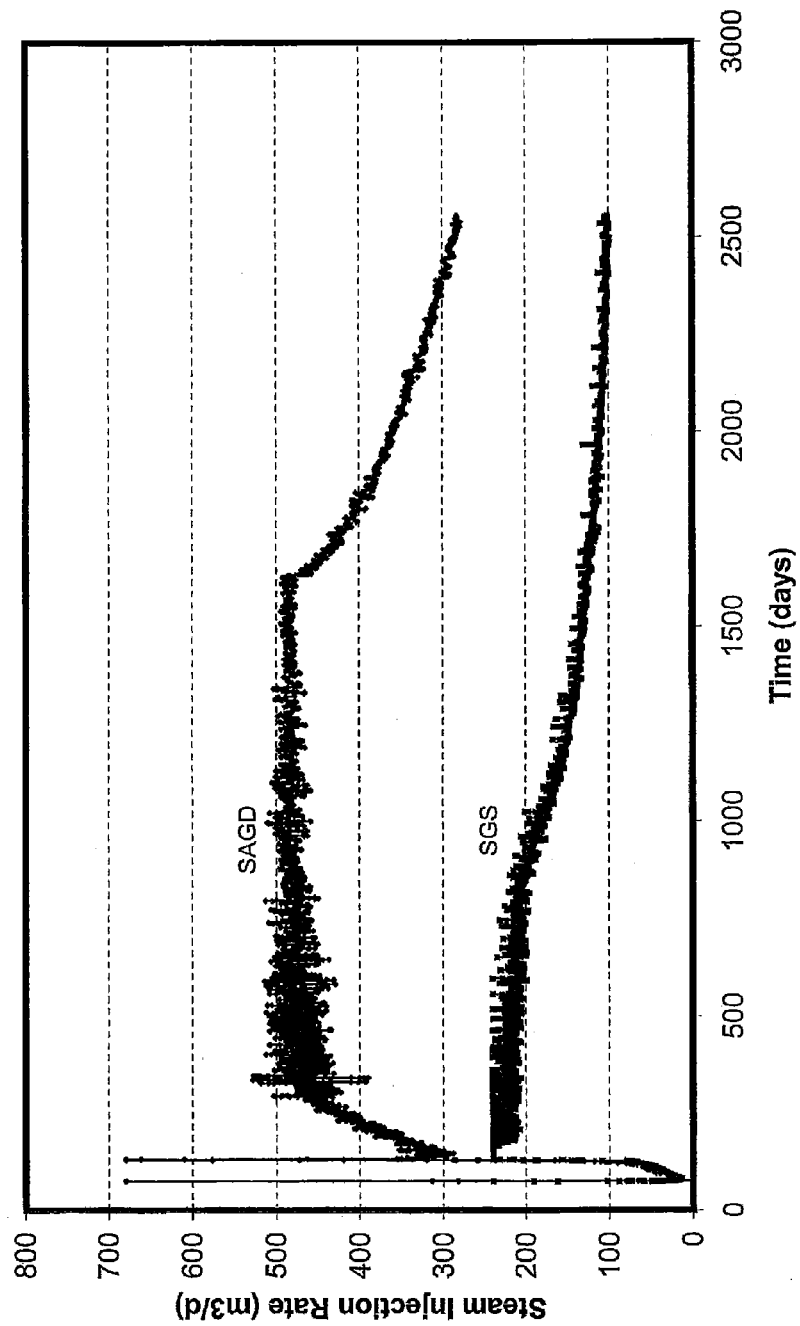
FIG. 3 is a plot of steam injection rate versus time, according to one embodiment of the invention.

FIG. 3 illustrates a plot of steam injection rate versus time. The steam injection rate for the SAGD process was about double the corresponding steam injection rate in the SGS process. To facilitate a comparison of the SAGD and SGS processes, the SAGD and SGS process were evaluated on the basis of the total amount of steam injected because the steam injection rate varies between the SAGD and SGS processes.

Figure 4:
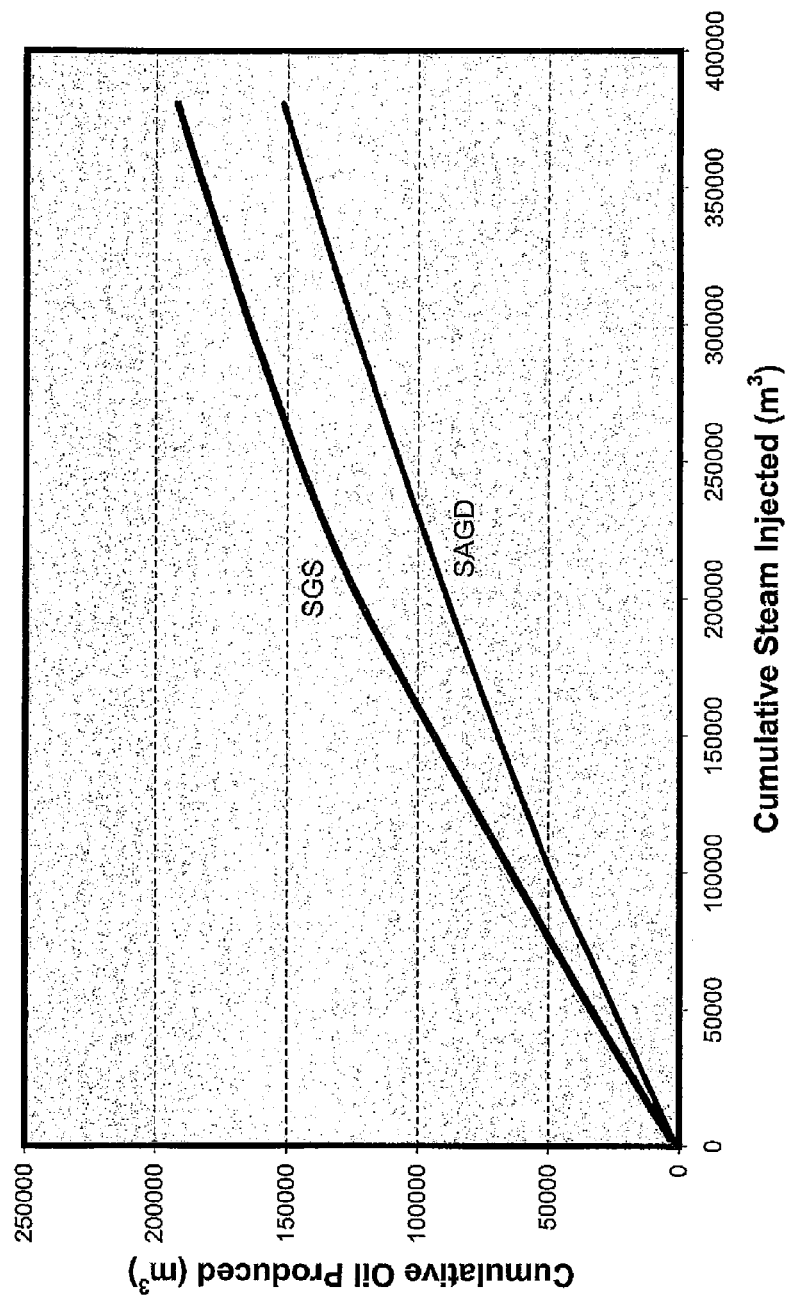
FIG. 4 is a plot of cumulative oil produced versus cumulative steam injected, according to one embodiment of the invention.
Figure 5:
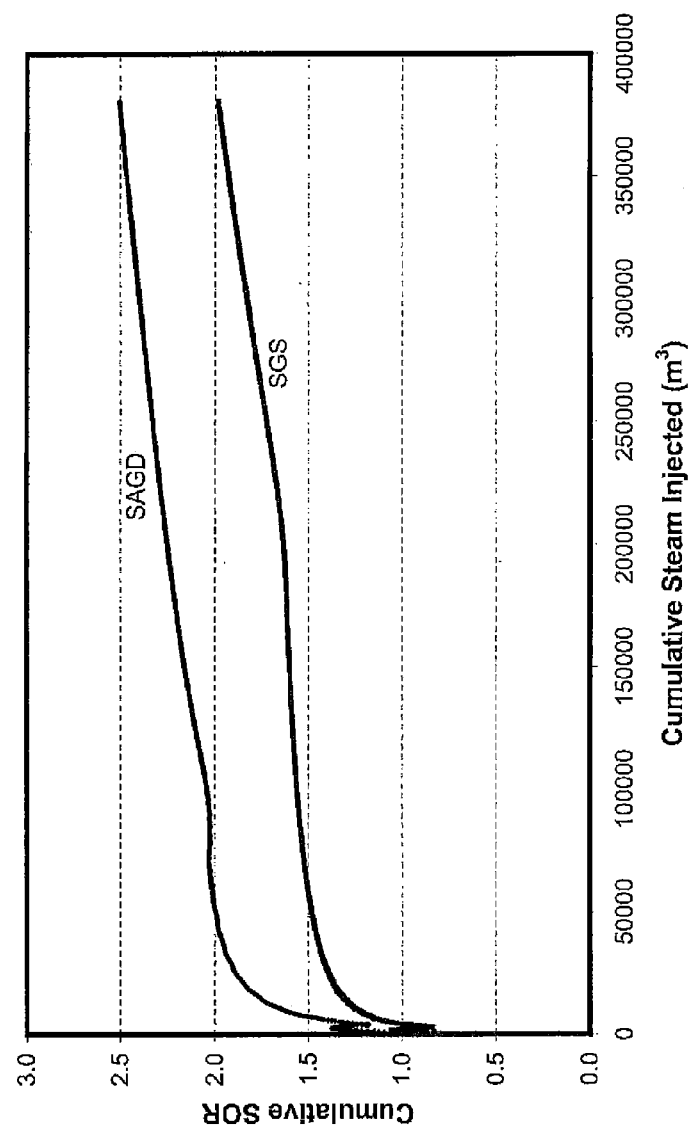
FIG. 5 is a plot of cumulative steam to oil ratio (SOR) versus cumulative steam injected, according to one embodiment of the invention.

FIGS. 4 and 5 thus depict respective plots for cumulative heavy crude oil or bitumen produced versus cumulative steam injected into the reservoir and cumulative steam to oil ratio (SOR) versus cumulative steam injected. As compared to the same amount of steam in the SAGD process, the steam-methane-hexane mixture in the SGS process significantly increases heavy crude oil or bitumen production. For example, after the injection of about 380,000 cubic meters of steam, the SGS process produced about 26 percent more oil than the SAGD process. This increase in oil production was the result of synergistic influence of the gas (i.e., methane) and the solvent (i.e., hexane) being injected with the steam. It is believed that the injected gas helps to maintain the reservoir pressure, fills the void spaces created by the produced oil and, possibly, reduces oil viscosity and steam requirements. Further, the solvent is believed to dilute the heavy crude oil or bitumen and to act with the steam to reduce the viscosity of the hydrocarbons.

The SGS process significantly decreases cumulative steam consumption to produce the same amount of oil as the SAGD process. For example, to produce about 150,000 cubic meters of heavy crude oil or bitumen, the SAGD process requires about 380,000 cubic meters of steam, whereas the SGS only needs about 250,000 cubic meters—about 35 percent less steam. This decrease in steam was the result of the gas (i.e., methane) and the solvent (i.e., hexane) being injected with the steam.

The SGS process resulted in lower steam to oil ratio (SOR) than the SAGD process. For example, after injecting 380,000 cubic meters of steam, the SAGD process has an SOR of about 2.5, whereas the SGS process has an SOR of about 2—about a 20 percent reduction. Further, the SAGD process produced 150,000 cubic meters of heavy crude oil or bitumen at an SOR of about 2.5, whereas the SGS process produced 189,000 cubic meters of oil at an even lower SOR of about 2.0.

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone: A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term "liquid" as applied to the treatment medium includes liquid and dense phase states also known as critical and super critical states.

As used herein, the term "simultaneously" means occurring at the same time or about the same time, including concurrently.

What is claimed is:

1. A method comprising:
    injecting steam into a formation to transfer heat to hydrocarbons in the formation resulting in condensation of the steam;
    injecting into the formation a solvent for the hydrocarbons and that is liquid under reservoir operating conditions to reduce viscosity of the hydrocarbons upon dissolution with the solvent;
    injecting into the formation a gas non-condensable under reservoir operating conditions to supplement the steam in maintaining of pressure in the formation as the hydrocarbons and condensate of the steam are being produced, wherein the steam, gas and solvent are injected at a volume fraction of between about 0.10 to 0.30 of steam, between about 0.60 to 0.90 of gas, and between about 0.01 to 0.10 of solvent, wherein the sum of the volume fractions is equal to about 1.0; and
    producing from the formation the hydrocarbons mobilized by the injecting of the steam and the solvent, wherein the injecting is through a first well with a constant injection pressure maintained for at least 2000 days, the producing is through a second well and the first and second wells are arranged in the formation in a steam assisted gravity drainage well pair orientation.

2. The method of claim 1, wherein the gas is selected from the group consisting of air, nitrogen, hydrogen, oxygen, carbon dioxide, carbon monoxide, hydrogen sulfide, methane, ethane, propane, butane, natural gas, flue gas and mixtures thereof.

3. The method of claim 1, wherein the solvent is selected from the group consisting of hydrocarbons in C3-C30 range, carbonless compounds and mixtures thereof.

4. The method of claim 1, wherein:
    the gas is selected from the group consisting of air, nitrogen, hydrogen, oxygen, carbon dioxide, carbon monoxide, hydrogen sulfide, methane, ethane, propane, butane, natural gas, flue gas and mixtures thereof; and
    the solvent is selected from the group consisting of hydrocarbons in C3-C30 range, carbonless compounds and mixtures thereof.

5. The method of claim 1, further comprising adjusting injection rate of the gas to maintain the pressure.

6. A method comprising:
    injecting steam into a formation to transfer heat to hydrocarbons in the formation resulting in condensation of the steam;
    injecting into the formation a solvent for the hydrocarbons and that is liquid under reservoir operating conditions to reduce viscosity of the hydrocarbons upon dissolution with the solvent;
    injecting into the formation a gas non-condensable under reservoir operating conditions to supplement the steam in maintaining of pressure in the formation as the hydrocarbons and condensate of the steam are being produced, wherein the hydrocarbons also dissolve in the gas and a larger volume fraction of the gas is injected compared to fractions of the steam and the solvent; and
    producing from the formation the hydrocarbons mobilized by the injecting of the steam and the solvent, wherein the injecting is through a first well with a constant injection pressure maintained for at least 2000 days, the producing is through a second well and the first and second wells are arranged in the formation in a steam assisted gravity drainage well pair orientation.

7. A method comprising:
    forming within a formation a steam-gas-solvent well pair comprising an injection well and a production well;
    injecting into the injection well a steam-gas-solvent mixture to mobilize hydrocarbons in the formation, wherein the steam-gas-solvent mixture comprises:
        steam;
        a gas non-condensable under reservoir operating conditions; and
        a solvent for the hydrocarbons and that is condensable under reservoir operating conditions, wherein the steam-gas-solvent mixture is injected at a volume fraction of about 0.160 of steam, about 0.824 of gas, and about 0.016 of solvent; and
    producing from the formation and through the production well the hydrocarbons that are mobilized, wherein the steam-gas-solvent mixture is injected continuously for 2500 days with a total fluid injection rate adjusted to maintain a bottomhole pressure at 3.4 megapascals and the injection and production wells are parallel, horizontal and vertically spaced apart.

8. The method of claim 7, wherein the gas is selected from the group consisting of air, nitrogen, hydrogen, oxygen, carbon dioxide, carbon monoxide, hydrogen sulfide, methane, ethane, propane, butane, natural gas, flue gas and mixtures thereof.

9. The method of claim 7, wherein the solvent is selected from the group consisting of hydrocarbons in C3-C30 range, carbonless compounds and mixtures thereof.

10. The method of claim 7, wherein the injection and production wells are vertically spaced apart about 4 to 6 meters.

\* \* \* \* \*